(12) United States Patent
Keosayian

(10) Patent No.: US 12,503,974 B1
(45) Date of Patent: Dec. 23, 2025

(54) SUPERCHARGER MODIFICATIONS

(71) Applicant: Kong Performance LLC, Chester Heights, PA (US)

(72) Inventor: Gregory Keosayian, Chester Heights, PA (US)

(73) Assignee: Kong Performance LLC, Chester Heights, PA (US)

( * ) Notice: Subject to any disclaimer, the term of this patent is extended or adjusted under 35 U.S.C. 154(b) by 0 days.

(21) Appl. No.: 18/885,181

(22) Filed: Sep. 13, 2024

(51) Int. Cl.
*F02B 33/38* (2006.01)
(52) U.S. Cl.
CPC ................................ *F02B 33/38* (2013.01)
(58) Field of Classification Search
CPC ..................................................... F02B 33/38
See application file for complete search history.

(56) References Cited

U.S. PATENT DOCUMENTS

| | | | |
|---|---|---|---|
| 7,426,921 B2* | 9/2008 | Billings | F02M 35/10288 123/563 |
| 9,366,258 B2* | 6/2016 | Suzuki | F04C 29/066 |
| 10,273,827 B2* | 4/2019 | Malins | B22C 7/026 |
| 10,480,534 B2* | 11/2019 | Mahalatkar | F04D 25/024 |
| 10,760,574 B2* | 9/2020 | De Bock | F04C 29/0021 |
| 10,968,910 B2* | 4/2021 | Peterson | F04C 27/007 |
| 11,339,708 B2* | 5/2022 | Kim | F02M 35/1216 |
| 2011/0014039 A1* | 1/2011 | Espasa | F01D 5/04 83/13 |
| 2017/0067464 A1* | 3/2017 | Swartzlander | F04C 18/126 |
| 2018/0306191 A1* | 10/2018 | Kim | F04C 29/063 |

* cited by examiner

*Primary Examiner* — Jesse S Bogue
(74) *Attorney, Agent, or Firm* — Condo Roccia Koptiw LLP

(57) ABSTRACT

A supercharger includes an insert affixed proximate to an air intake structure. Portions of the insert and the air intake structure are removed to enhance airflow into the supercharger. The supercharger body is typically cast aluminum and the insert is typically machined from aluminum. Conventional aluminum alloys may be used.

16 Claims, 17 Drawing Sheets

SUPERCHARGER MODIFICATIONS

BACKGROUND

The present invention relates to internal combustion engines, and more particularly superchargers for enhancing air flow into an internal combustion engine.

An internal combustion engine ignites a mixture of air and fuel to generate power. For a given volumetric displacement of the cylinders of the engine, forcing more air into the engine can produce more power. A supercharger compresses intake air, referred to as forced induction, to increase the pressure and density of air entering the engine. In this way, a supercharger boosts engine performance.

Popular superchargers (roots and screw type), consist of two rotors, symmetrical or asymmetrical in design. Some conventional superchargers include a pair of rotors as described above, a rotor housing having internal chambers that houses the rotors, an input shaft and a drive pulley that is coupled to the engine crankshaft by a belt.

Referring to FIG. 1, a conventional supercharger 109 includes a rotor housing 110, a cover 150, a nose drive 170, and a throttle body 190. Rotor housing 110 includes a pair of rotor bores 112 for housing a pair of rotors 113 and a pair of cooler recesses 114 for housing a pair of coolers 115. An input shaft 116 is mechanically coupled to one of the rotor shafts and to gearing (not shown in the figures) for driving a second one of the rotor shafts. The input shaft 116 is driven from a pulley that is belt driven from the engine.

FIGS. 2, 3, and 4 illustrate a conventional rotor housing 110 having rotor bores 112, cooler recesses 114, and air inlet structure, generally indicated by reference number 120, that defines an air path 121. Rotor housing 110 includes a bypass valve housing 126 and an input shaft housing 128. Rotor housing 110 typically is a metal casting.

Some conventional air inlet structures, such as those shown in FIGS. 2 through 4, are modified by enlarging the air inlet structure, or by removing material in such a way that increases overall supercharger efficiency. In other words, the airflow efficiency through the air inlet structure may be increased by enlarging or changing portions of the air inlet structure. For example, portions of the air inlet structure may be machined to enlarge or change the air path, thereby decreasing airflow resistance or pressure drop. In some circumstances, the magnitude of the enlargement of the air inlet structure may be limited by the wall thickness or boundaries of the existing air inlet structure. In this regard, the extent of the modifications may be limited by the existing geometry of the air inlet structure. A common method of enhancing supercharger air flow includes building up the wall thickness or modifying the boundaries of the rotor housing in predetermined areas by welding or adding epoxy, then machining the air inlet structure by removing portions of the housing and the epoxy or weld.

SUMMARY

A method for modifying a supercharger for an internal combustion engine to enhance airflow characteristics and supercharger efficiency includes the steps of: providing a supercharger rotor housing including an air inlet structure that defines an airflow path; affixing an insert to a landing portion of the supercharger rotor housing proximate the air inlet structure; and machining the air inlet structure to improve the airflow path, thereby enhancing airflow through the air inlet structure such that a portion of the insert defines a portion of the airflow path after the machining step The method may further include machining the portion of the insert that defines the airflow path. The insert may be formed via 3D printing in its useful configuration such that the insert is not machined. Thus, the insert may be machined after the insert is affixed to the rotor housing or the insert may be formed in its final configuration before affixing to the rotor housing.

The machining step may include machining the landing portion such that the landing portion is suitable for receiving the insert. Preferably, the rotor housing and insert are formed of a cast aluminum alloy, without limitation. The method may included applying an adhesive to a mating surface of at least one of the landing surfaces and the insert, thereby filling gaps therebetween. Preferably, the supercharger is an OEM supercharger that is modified via the method.

The supercharger for an internal combustion engine includes: a rotor housing including air intake structure and a landing surface proximate the air intake structure, the rotor housing case being formed of a metal casting (which term encompasses a billet); and an insert affixed to the landing surface of the rotor housing case. A portion of the metal casting proximate the air intake structure opposite the landing surface is machined, thereby enhancing airflow through the supercharger.

A portion of the insert may be machined, thereby enhancing airflow through the supercharger. The insert may be formed via 3D printing in its useful configuration such that the insert is not machined. Thus, the insert may be machined after the insert is affixed to the rotor housing or the insert may be formed in its final configuration before affixing to the rotor housing. The insert preferably is affixed to the landing surface of the rotor housing case via screws.

The rotor housing may have a first configuration as supplied by an OEM, and the rotor housing may have a second configuration in which portions have been removed from the first configuration.

DETAILED DESCRIPTION OF PREFERRED EMBODIMENTS

Figure 1:
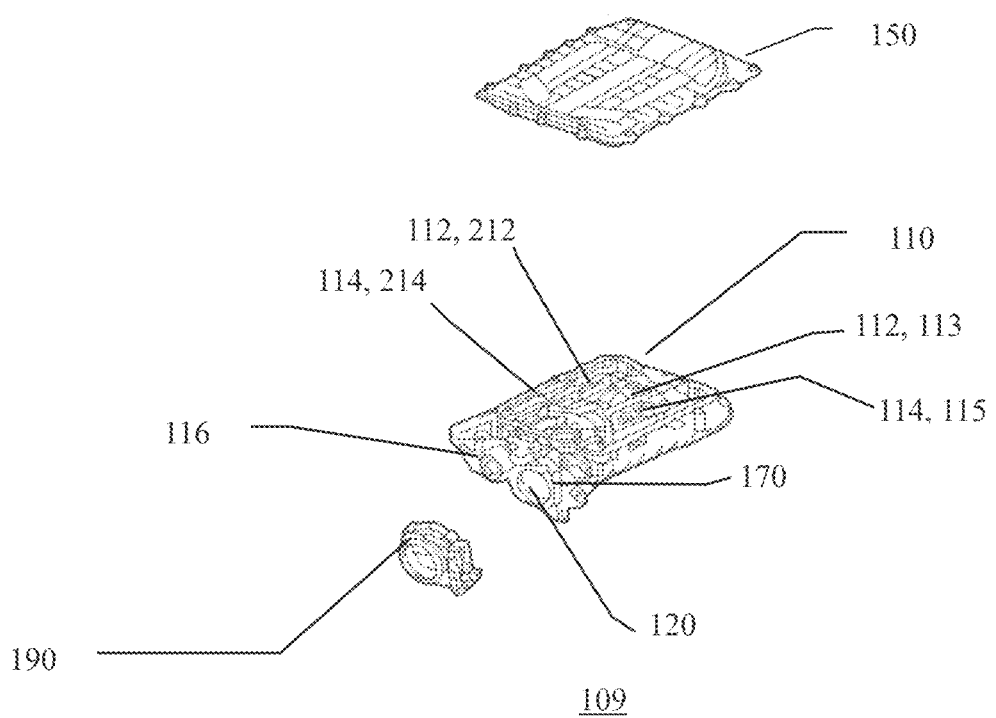
FIG. 1 is a partially exploded, schematic view of conventional supercharger components.
Figure 2:
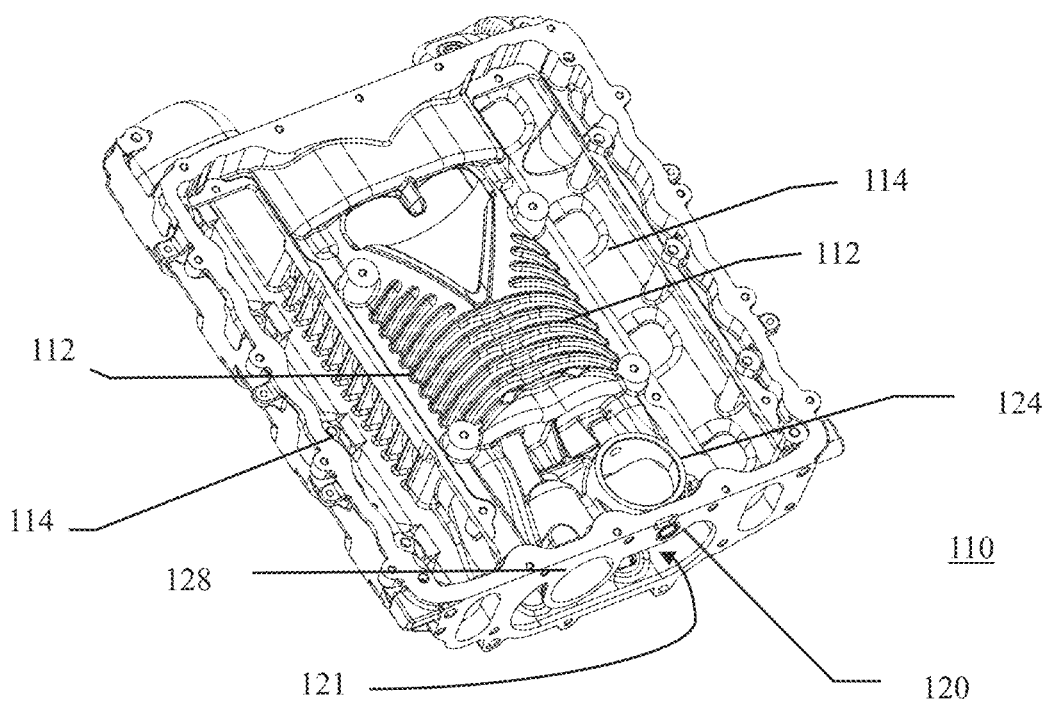
FIG. 2 is a top perspective view of the rotor housing of a conventional supercharger.
Figure 3:
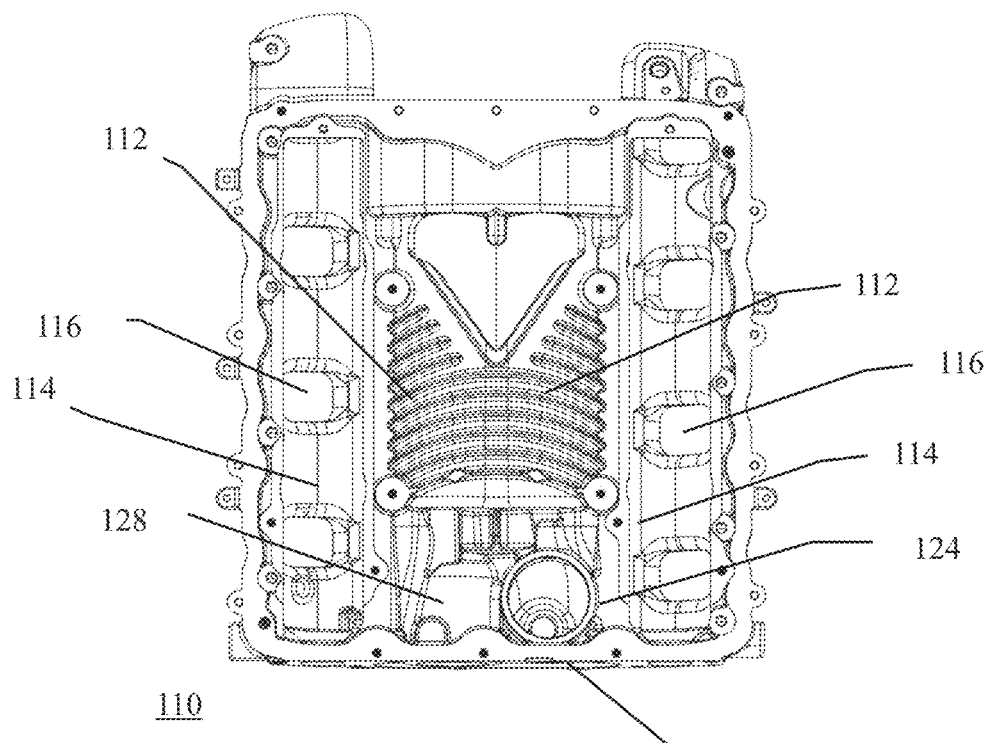
FIG. 3 is a top plan view of the conventional supercharger rotor housing of FIG. 2.
Figure 4:
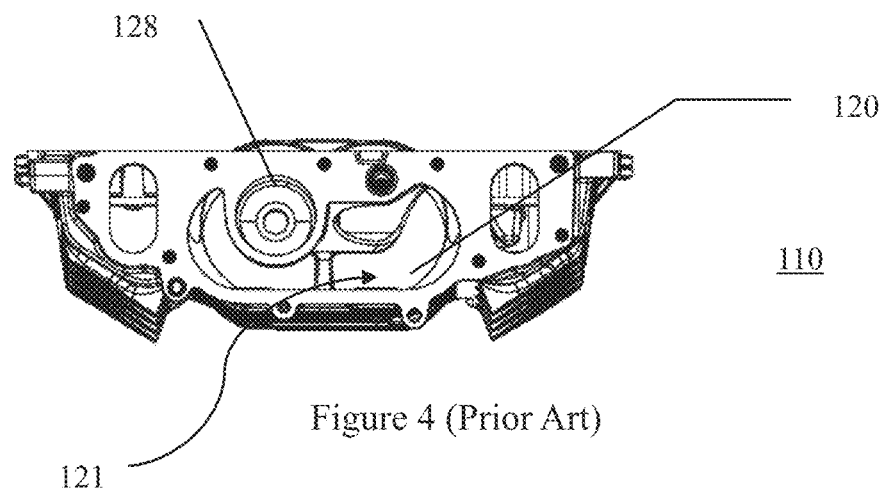
FIG. 4 is an elevation view of the air inlet side of the supercharger rotor housing of FIG. 2.

Referring to the figures, a supercharger 9 includes a rotor housing 10, a lid or cover 180 located on top of the rotor housing 10, and a nose drive 40. Cover 180 and nose drive 140 may be conventional. Supercharger housing 10, in the embodiment illustrated the figures, includes a pair of counter-rotating rotors 212, a pair of coolers 214, and a drive including a drive shaft and gearing that transmits rotation from the drive shaft to a supercharger pulley via a belt to the rotors. The rotors, coolers, and drive may be as described for prior art supercharger 109, described above in figure one.

Figure 5:
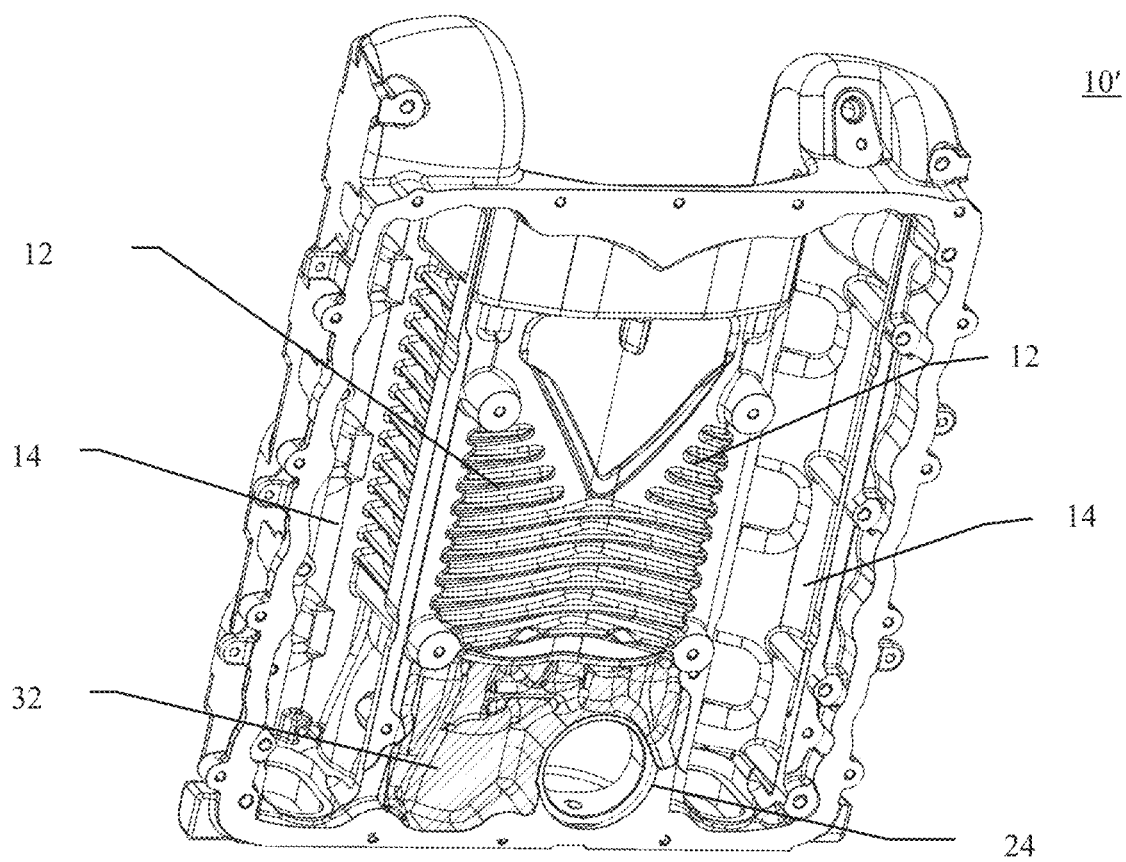
FIG. 5 is a perspective view of a supercharger rotor housing illustrating aspects of modifications according to an aspect of the present invention, with a portion of the air inlet structure prepared for receiving an insert.
Figure 6:
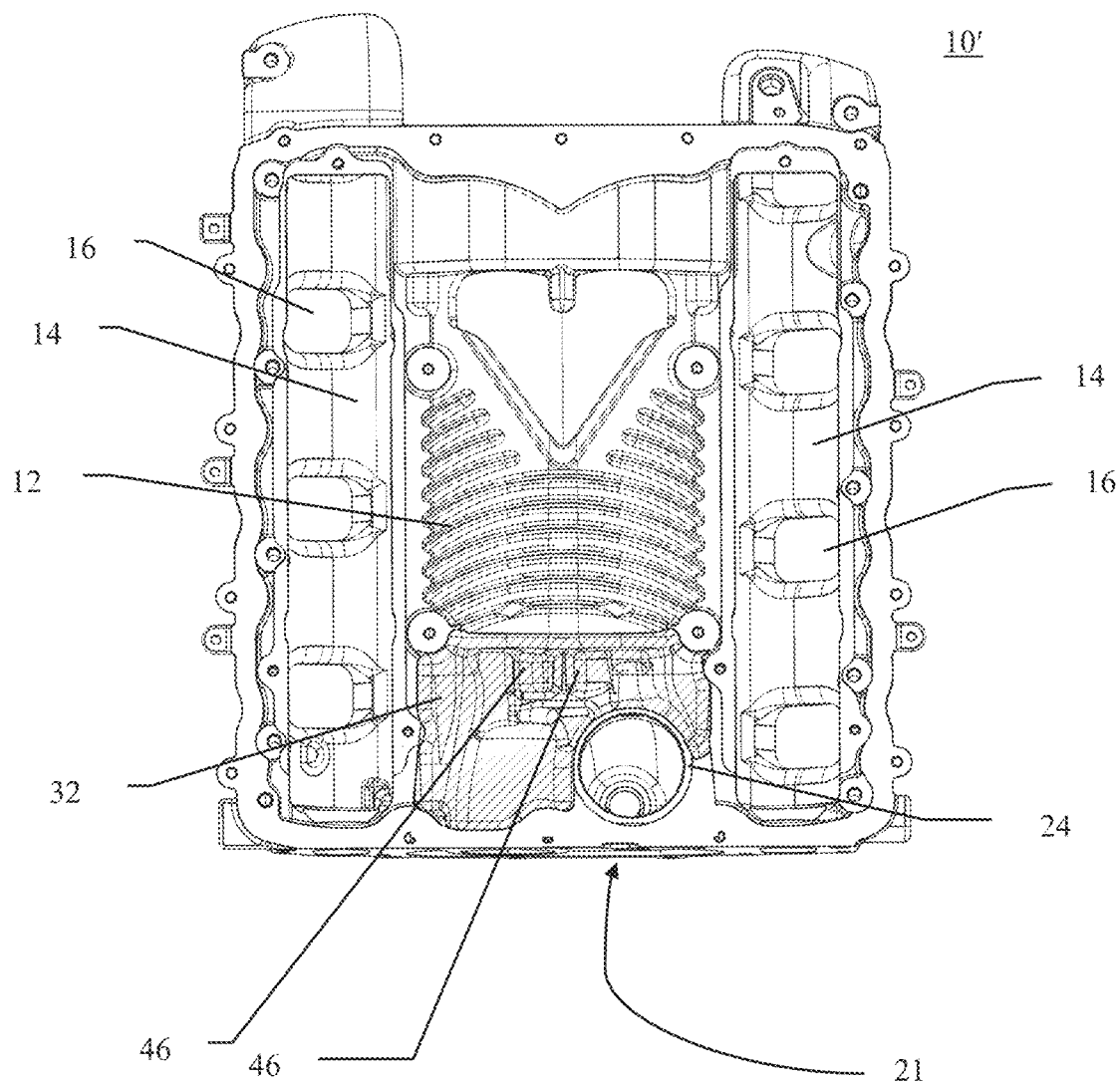
FIG. 6 is a top view of the supercharger shown in FIG. 5, illustrating portions of the air inlet structure removed to receive an insert.

Referring to FIGS. 5 and 6, rotor housing 10 includes a pair of rotor bores 12 for rotors, a pair of recess 14 for air coolers, air discharge ports 16 that open into cooler recesses 14, a input shaft housing 18 for receiving a input shaft assembly, an air inlet structure 20 that in part defines an airflow path 21, and a bypass valve port 24 for receiving a bypass valve (not shown in the figures). Supercharger rotor housing 10 has a shape and dimensions to engage a General Motors LT4 engine.

Rotor housing 10 is formed of a metal casting, such as a conventional aluminum alloy. Rotor housing 10 differs from prior art rotor housing, such as rotor housing 110, in that a portion of an inboard surface 30 of rotor housing 10 is prepared for receiving an insert 40 and rotor housing 10 includes a pair of threaded holes 48. In the embodiment of the FIGS. 5 and 6, a landing portion 32 (illustrated by highlighting) of inboard surface 30 is machined to reduce the surface roughness (and/or other surface finish parameters, such as waviness) typical of aluminum castings. Often, aluminum castings of commercial superchargers have a surface roughness of 4 to 25 microns (micrometers), depending on the choice of casting process, materials, and like parameters. All surface roughness units herein are averages (Ra) as described in ASME 46.

FIGS. 5 and 6 schematically illustrate the portion landing 32 as a machined surface by cross hatching or light lines. The magnitude of material removed by the machining process will depend on the particular surface roughness and other parameters of the casting and the desired surface roughness. Preferably a CNC machine is employed for machining portion 32, preferably to a surface roughness of 25 microns or less. The magnitude of the surface roughness after machining depends on the parameters of the specific application, as will be understood by persons familiar with machining rotor housings in view of the present disclosure. One goal of machining is to improve the suitability of the mating surface to prevent gas leakage between rotor housing 10 and insert 40 at the interface thereof. The machining of rotor housing 10 may also remove features, such as a boss or rib, where helpful to simplify the structure and/or improve airflow characteristics.

The present invention encompasses any means for the machining of landing 32 that diminishes its surface roughness. Accordingly, landing surface 32, where it interfaces with the corresponding surface of insert 40 (such as insert surface 42, explained below), may have a surface roughness that is at least 1 micron less, preferably at least 3 microns less, more preferably at least 8 microns less, and more preferably 20 microns less than the average surface roughness of the overall rotor housing casting in its unmachined state. If necessary, the surface roughness of the landing may be taken as an average surface roughness of the landing.

Figure 10:
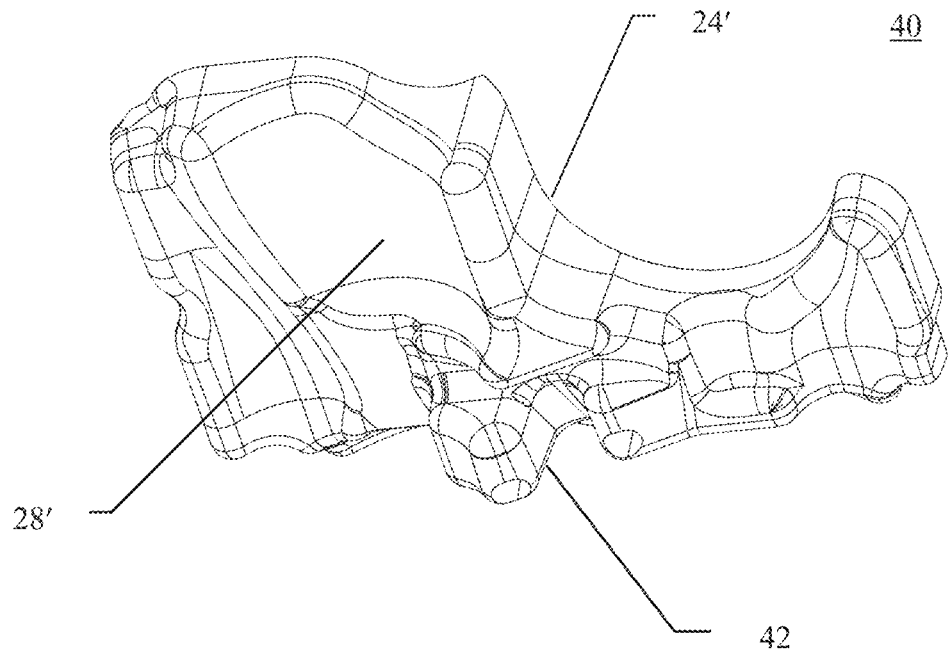
FIG. 10 is a perspective view of the underside of the insert.
Figure 11:
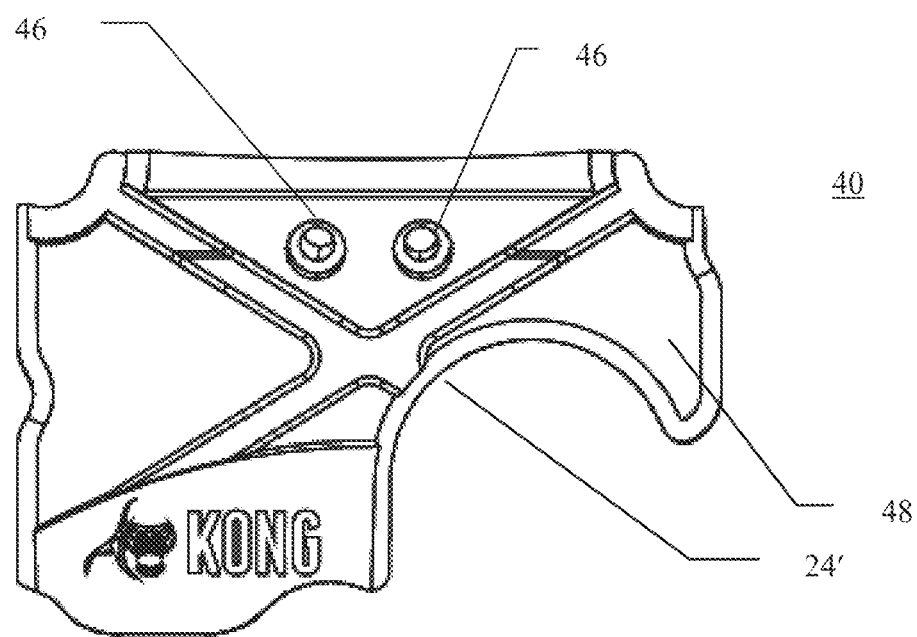
FIG. 11 is a top view of the insert.
Figure 12:
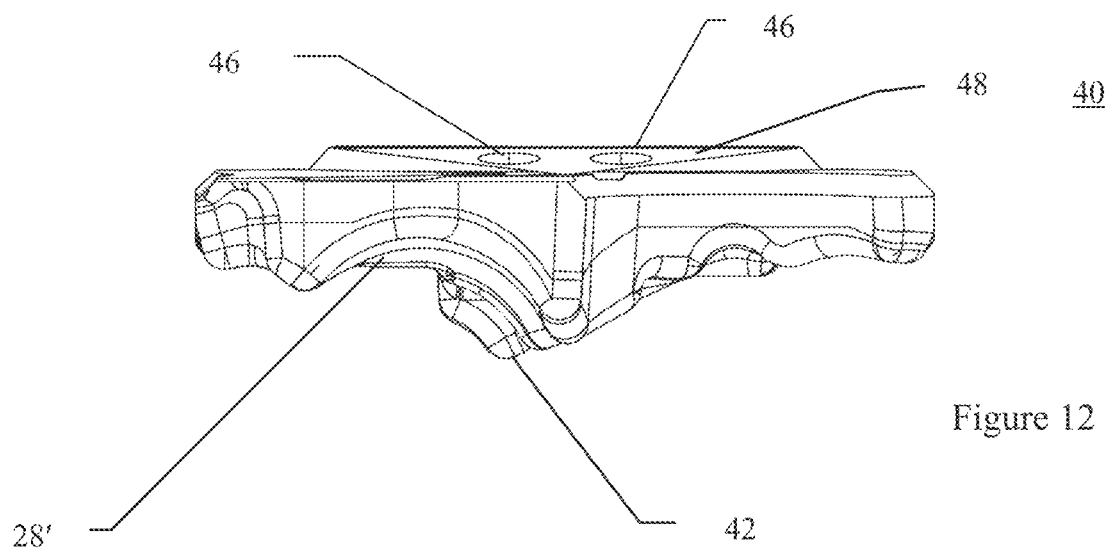
FIG. 12 a front side elevation view of the insert.
Figure 13:
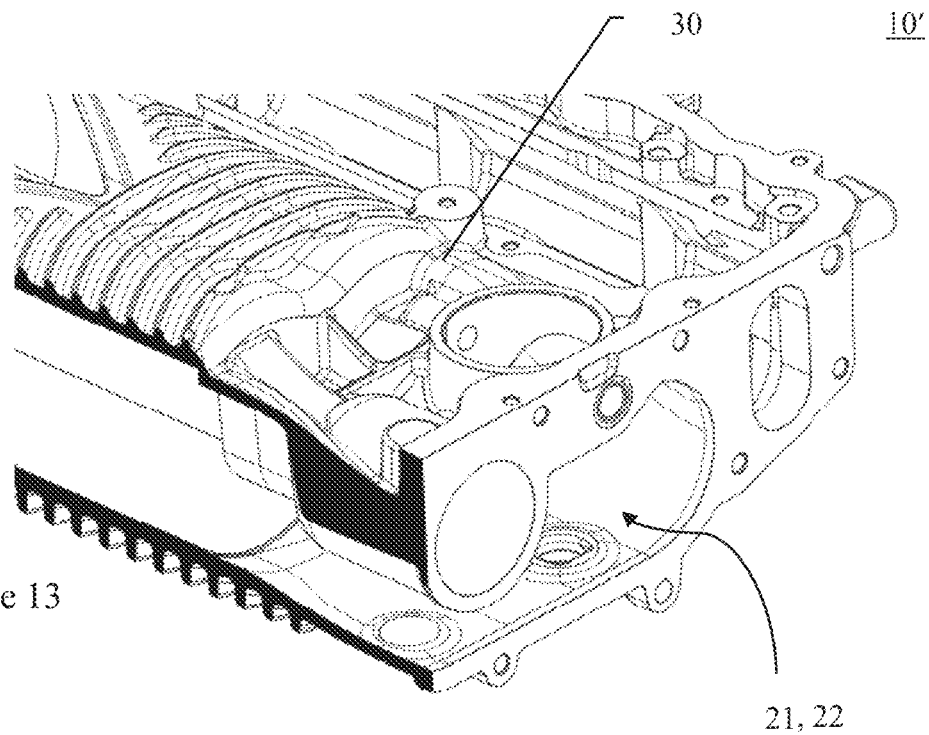
FIG. 13 is a perspective, cross sectional view of the supercharger prior to machining.

Insert 40, as best seen in FIGS. 10-12, includes an underside surface 42 and an opposing top surface 48. Insert body underside surface 42 has a shape that matches the corresponding surface of landing portion 32 of supercharger rotor housing 10. Underside surface 42 preferably is machined from a solid block of aluminum or other suitable material and has a surface roughness of 25 microns or less, preferably 15 microns or less, more preferably 8 microns or less, and more preferably 5 microns or less.

The shape and dimensions of the body of the insert will be determined by the corresponding shape of the supercharger portion to which the insert is to be applied. Insert 40 shown in FIGS. 5 and 6 includes an approximately flat top 48 with indicia, such as the branding shown in the figures and/or like. The particular embodiment of insert 40 of FIGS. 5 and 6 includes a recess or cutout 24' for receiving or contacting bypass valve port 24 and a curved recess 18' for receiving or contacting input shaft housing 18. Other features on the underside 42 of insert 40 are configured to match the structure of the machined rotor housing 10', such as structural gussets and the like.

Figure 7:
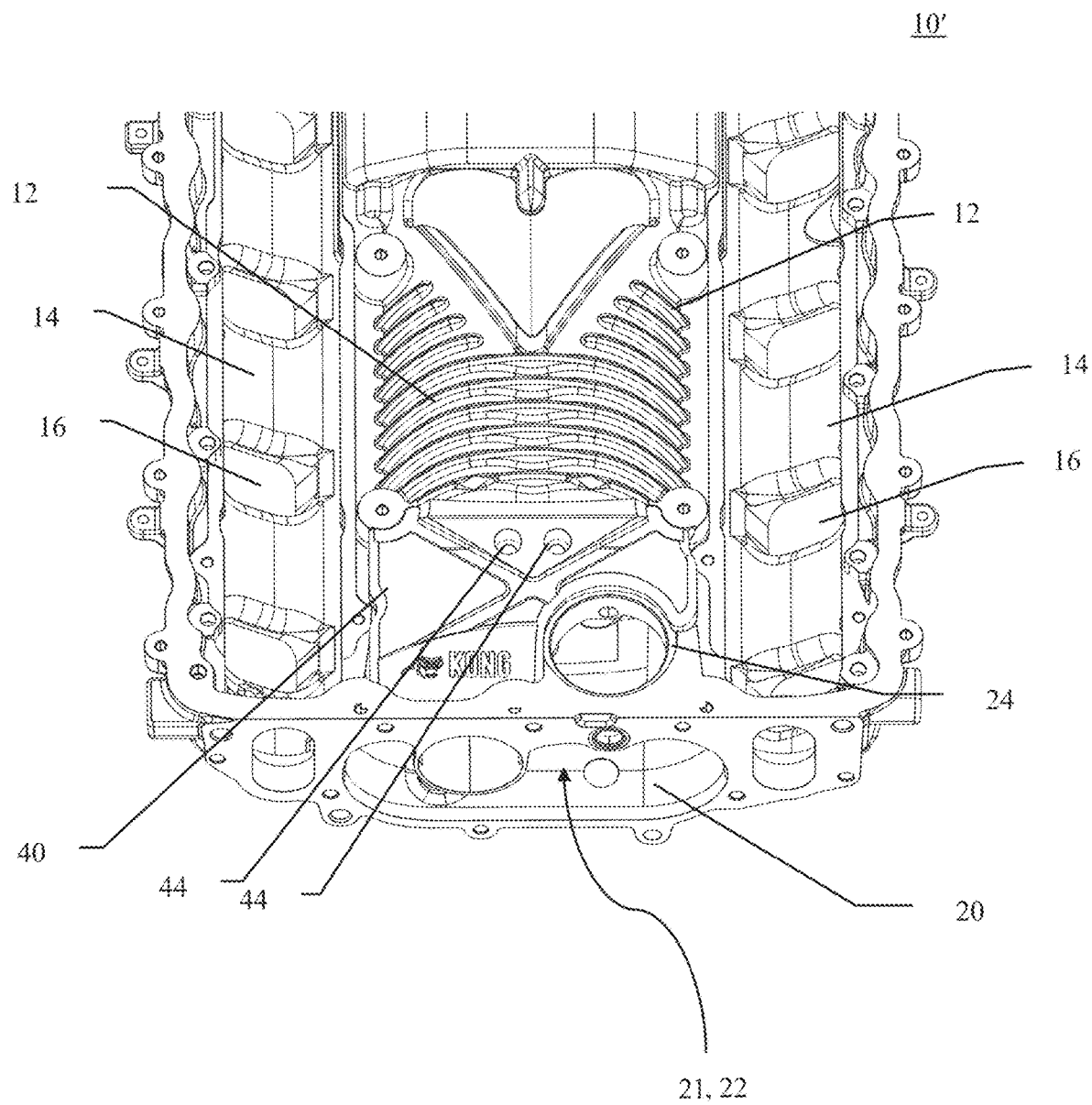
FIG. 7 is a perspective view of the supercharger shown in FIG. 5 with the insert installed.
Figure 8:
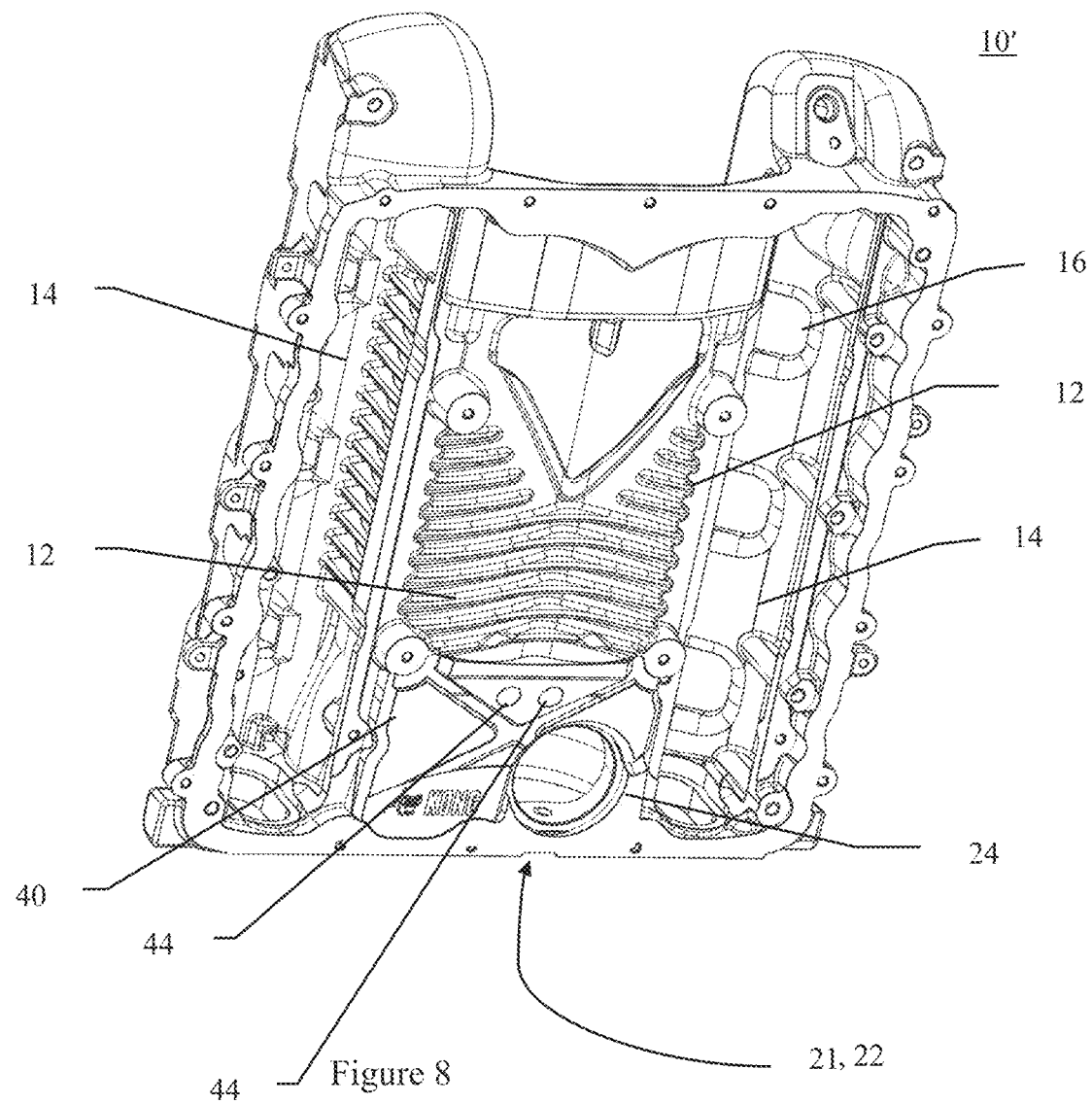
FIG. 8 is another perspective view of the supercharger shown in FIG. 7.
Figure 9:
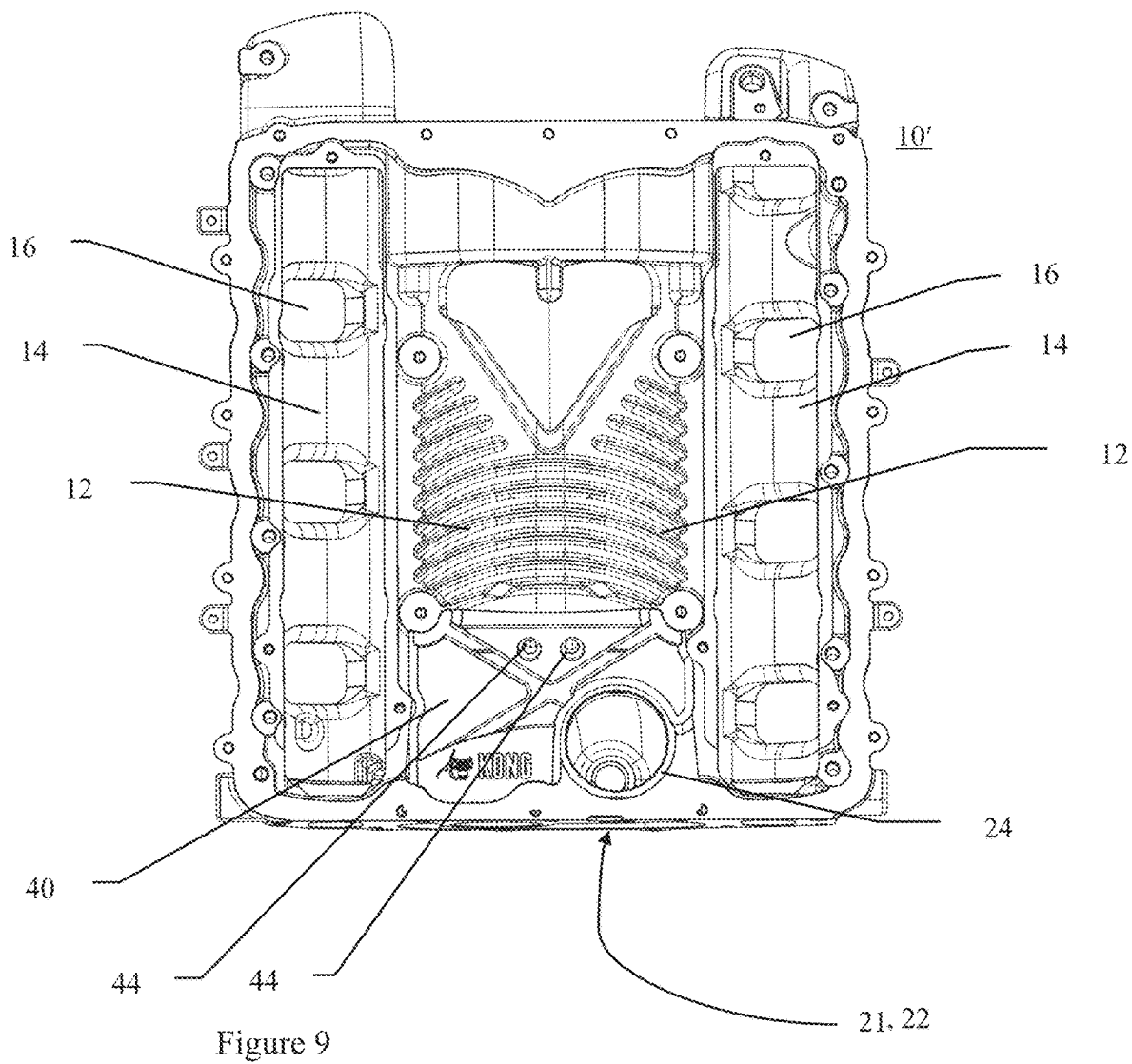
FIG. 9 is a top, plan view of the supercharger shown in FIG. 7.

FIGS. 7 through 9 illustrate insert 40 installed in rotor housing 10 by screws 44, which are inserted through countersink holes 46 (FIG. 10) that extend through insert 40. Screws 44 are engaged with threaded holes 48 in rotor housing 10, with the mating surfaces-insert surface 42 and rotor housing surface 32—in mutual contact. The particular shapes and dimensions of surfaces 32 and 42 depend on the particular configuration of the supercharger. In other words, the shape and dimensions of the features of insert surface 42 will depend on the commercial shape and dimensions of the corresponding features of the commercially provided supercharger, the magnitude of the machining or like preparation, and the overall desired improvement in air flow capacity of the inlet structure. The term "mutual contact" as used herein refers to any extent of conventional contact even if portions are spaced apart via filler, such as epoxy.

In this regard, upon affixing insert 40 into position in rotor housing 10, airflow path 21 may be enlarged or improved by machining portions of air inlet portion 22 of rotor housing 10 and portions of insert 40. Air inlet portion 22 is the structure of rotor housing 10. In the embodiment in FIGS. 7 through 9, the portion of air inlet portion 22 that is machined to enlarge air path 21 is on the underside (that is, the side opposing the side visible in the top view or opposing side of rotor housing surface 32. Insert 40 thus enables removal (by machining) of a greater portion of the air inlet structure 20 while maintaining continuity of the walls or boundaries of the air path. In this way, insert 40 enables an improved air inlet portion 22 through the airflow path 21, which can increase airflow and performance of the supercharger.

Figure 15:
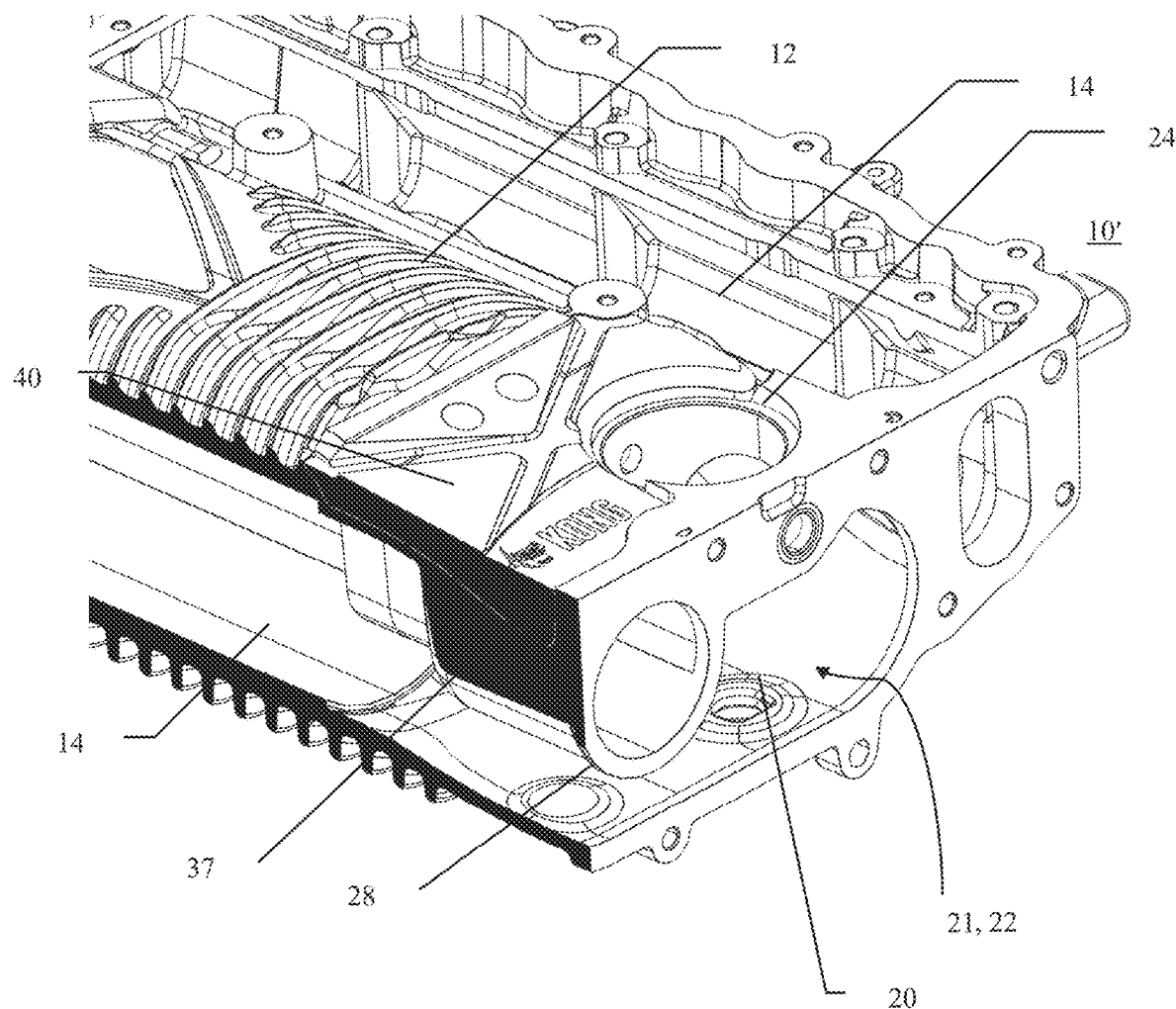
FIG. 15 is a perspective, cross sectional view of the supercharge of FIG. 14 with an insert installed.
Figure 16:
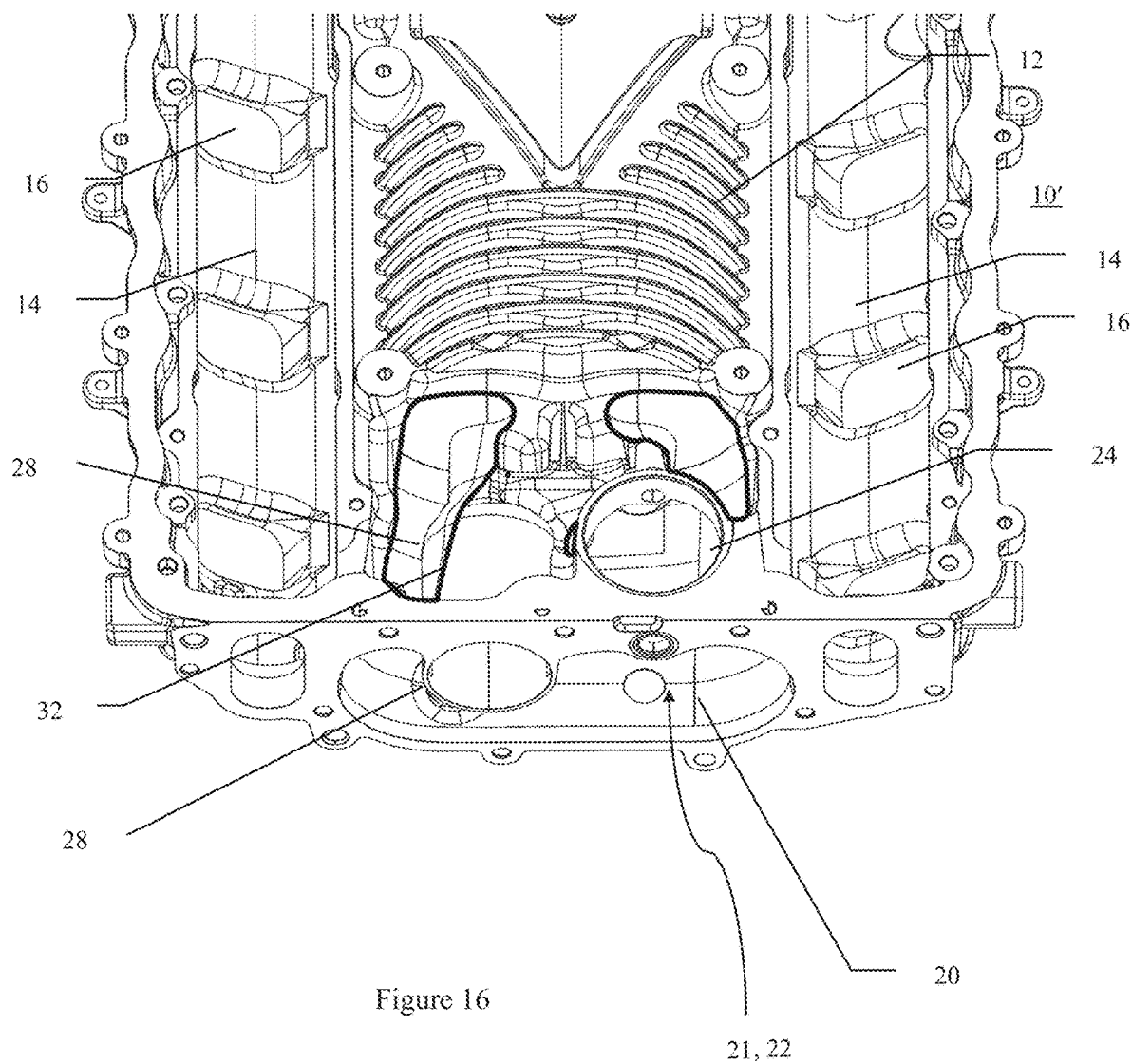
FIG. 16 is a front perspective view of the supercharger of FIG. 14, with the insert removed to illustrate the machined portion.
Figure 17:
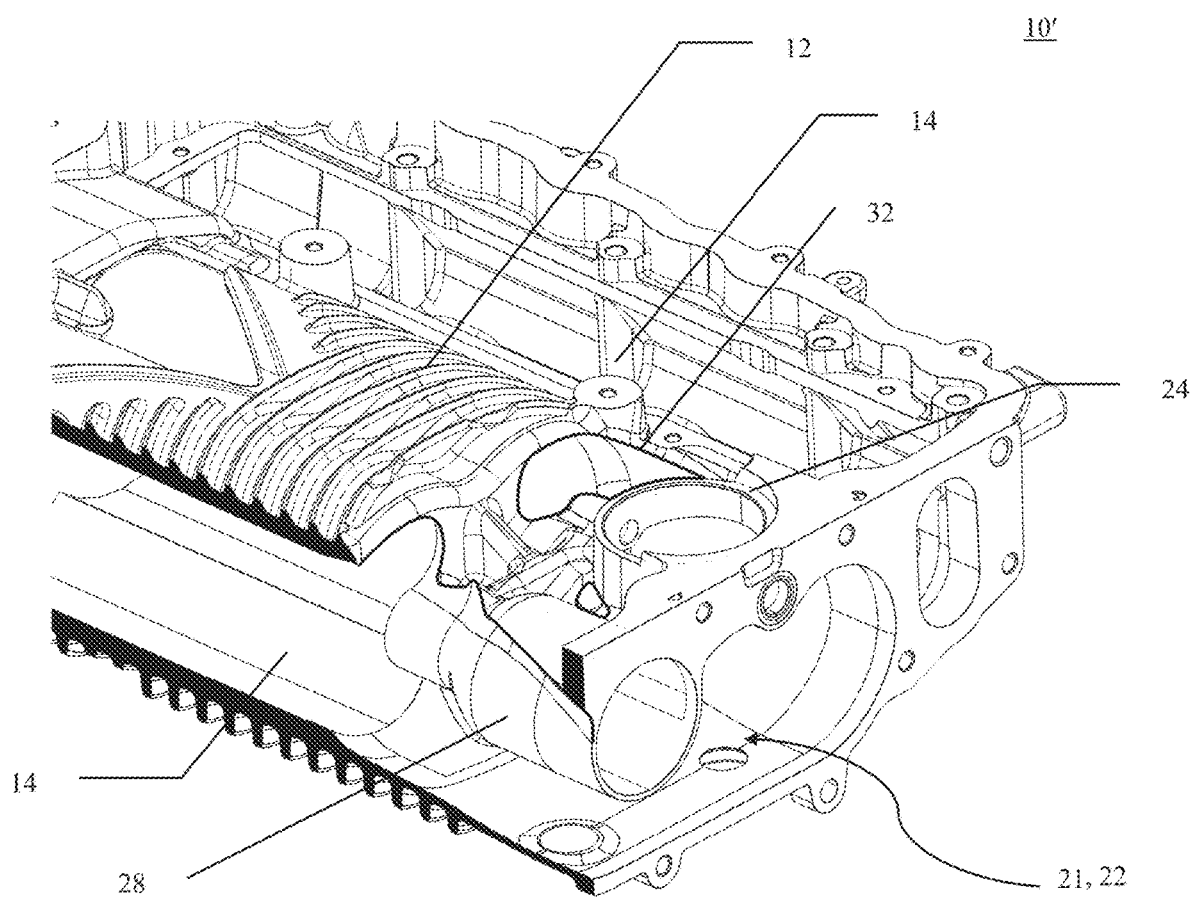
FIG. 17 is a perspective view of the supercharger of FIG. 16.
Figure 18:
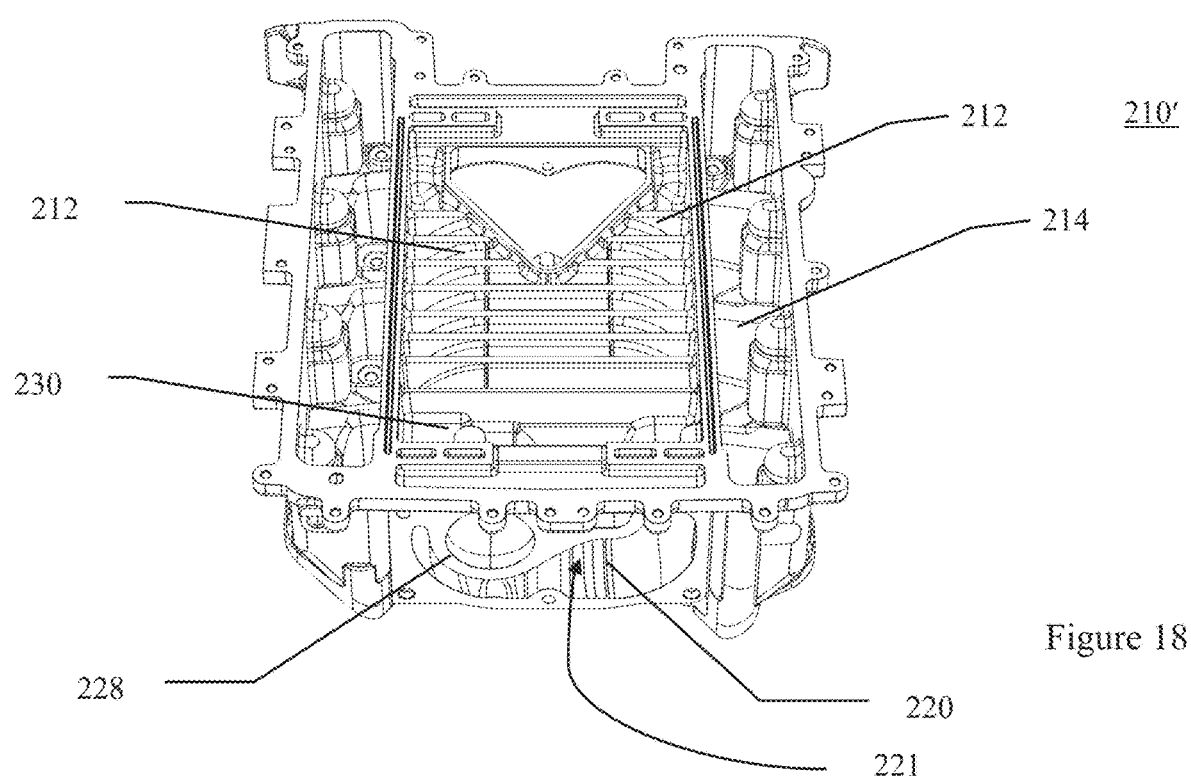
FIG. 18 is a top perspective view of a second embodiment supercharger rotor housing.
Figure 19:
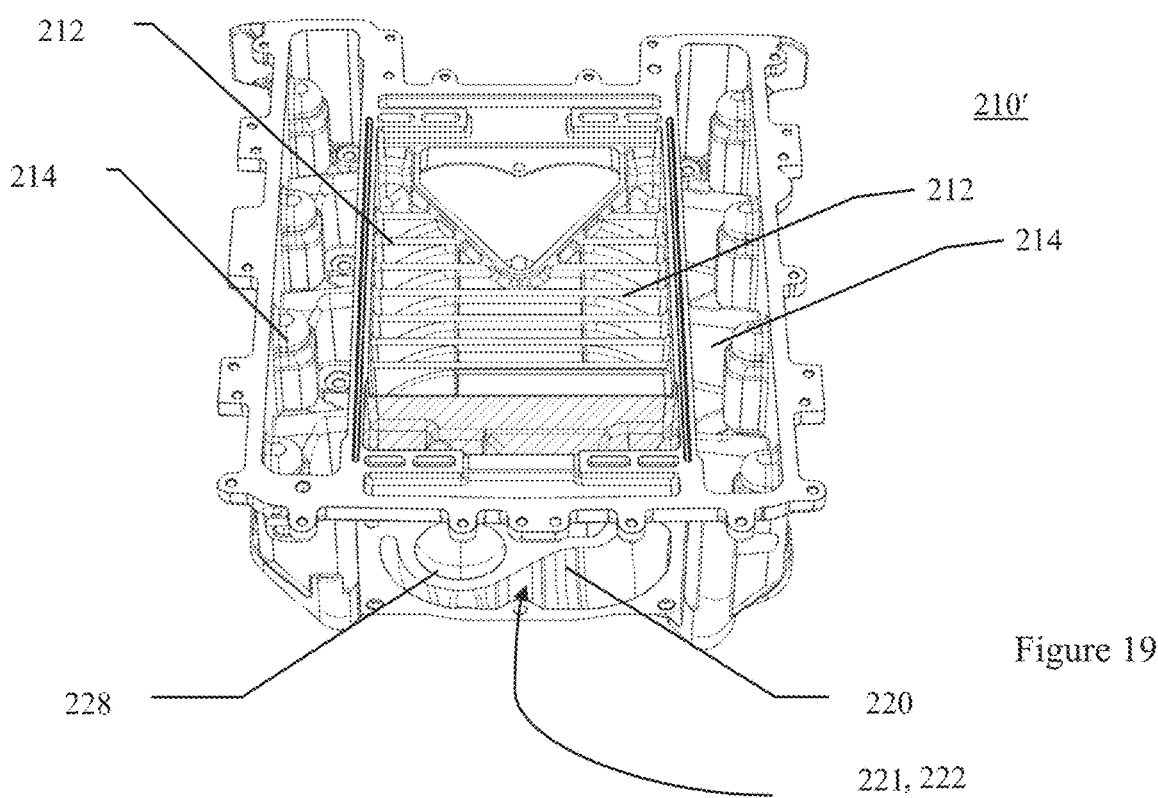
FIG. 19 is a top perspective view of the supercharger of FIG. 18 with a portion prepared for receiving an insert.

Reference number 37 shown in FIG. 15 indicates the engagement or parting line between surface 32 of rotor housing 10 and surface 42 of insert 40. As explained herein, the preferred means for preparing surface 32 is via CNC machining. The present invention also encompasses engagement between surfaces 32 and 42 without machining of surface 32. In this regard, epoxy, welding, or other filler and/or adhesive may be applied between supercharger surface 32 and insert surface 42. In circumstances in which a filler and/or adhesive is employed, machining of the supercharger surface 32 is optional. In other words, in some circumstances, the surface finish of supercharger surface 32 may be sufficient as supplied from the OEM without machining, as epoxy or like filler may provide a seal between surfaces 32 and 42 after machining.

FIGS. 18 through 21 illustrate a second embodiment supercharger rotor housing 210 that include rotor bores 212 for rotors, a pair of recess 214 for air coolers, an input shaft housing t 218 for receiving a input shaft assembly, and an air inlet structure 220 that in part defines an airflow path 221. Supercharger rotor housing 210 has a shape and dimensions to engage a General Motors LS9 engine.

Figure 20:
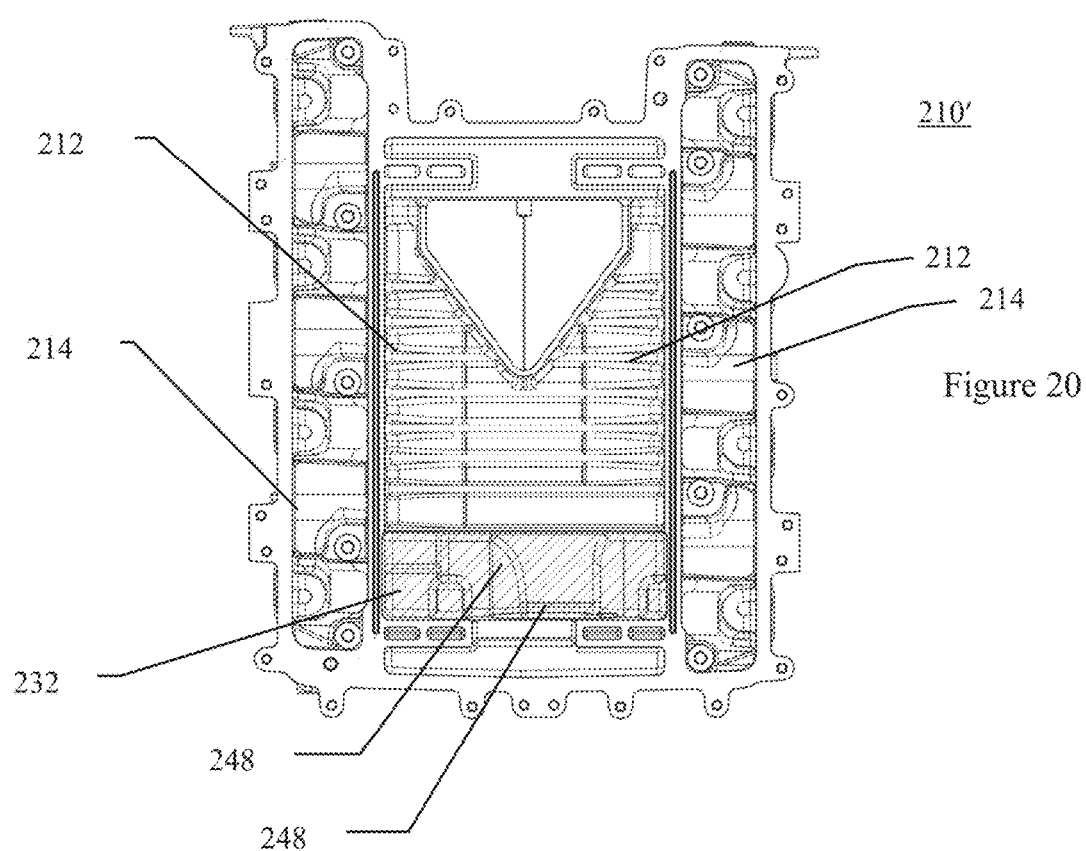
FIG. 20 is a top plan view of the supercharger of FIG. 19.
Figure 21:
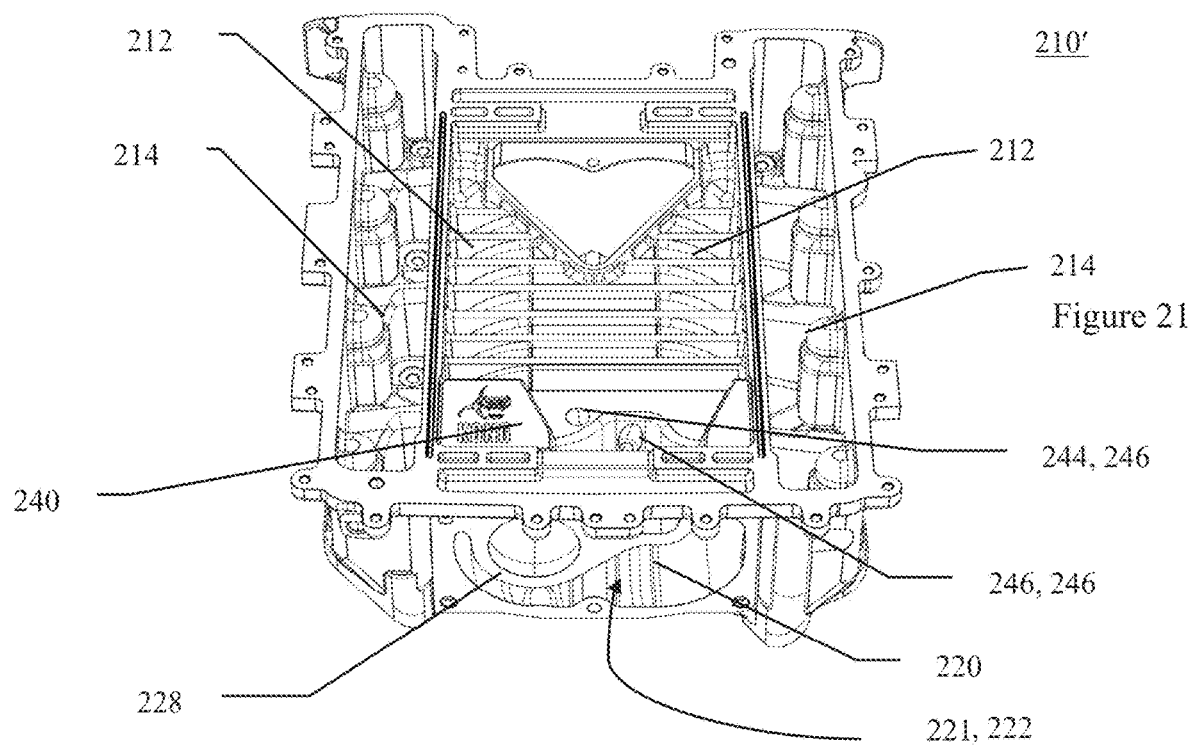
FIG. 21 is a top perspective view of the supercharger of FIG. 19 with an insert installed.
Figure 22:
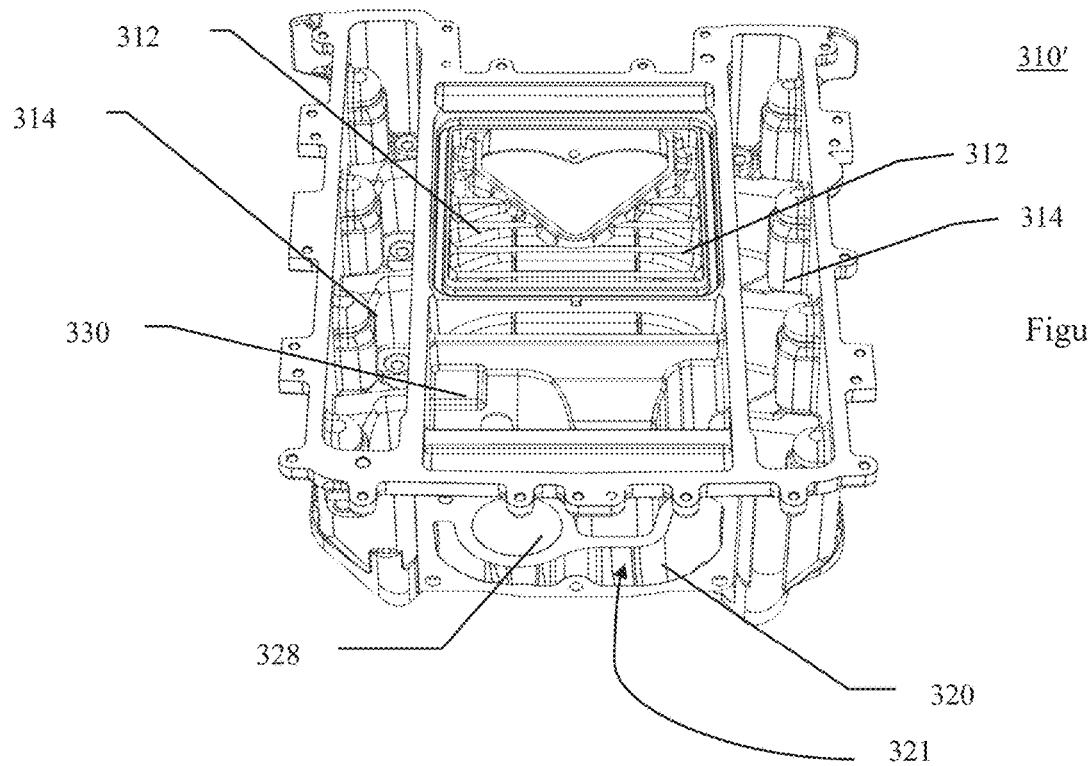
FIG. 22 is a top perspective view of a third embodiment supercharger rotor housing.
Figure 23:
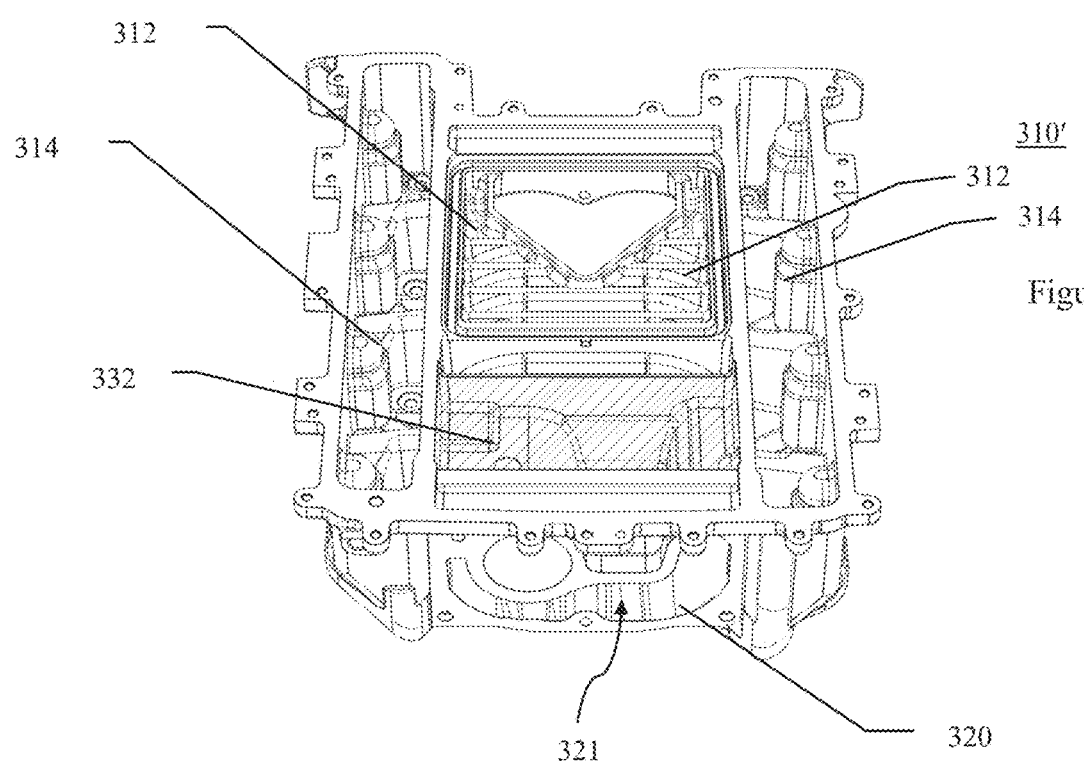
FIG. 23 is a top perspective view of the supercharger of FIG. 22 with a portion prepared for receiving an insert.
Figure 24:
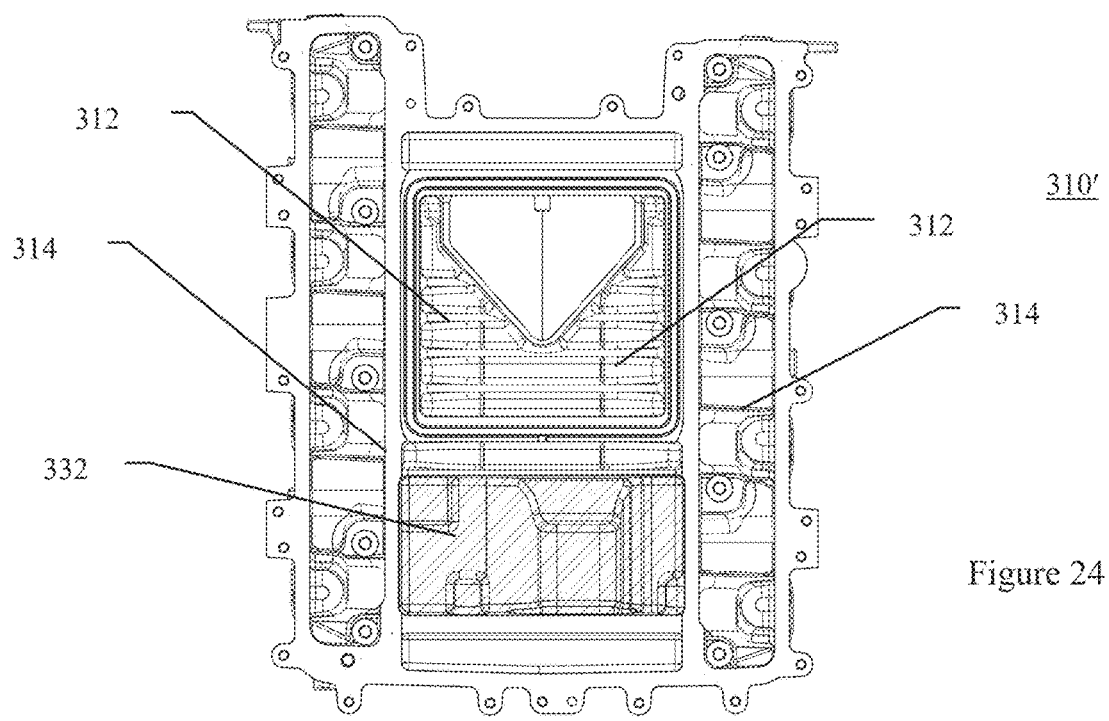
FIG. 24 is a top plan view of the supercharger of FIG. 23.

Rotor housing 210 includes an inboard surface 230 (FIG. 18) that is prepared for receiving an insert 240 (FIG. 21). Rotor housing 210 includes a pair of threaded holes 248 (FIG. 20). In the embodiment of the FIGS. 19 and 20, a landing portion 232 (illustrated by highlighting) of inboard surface 230 is machined to reduce the surface roughness (and/or other surface finish parameters, such as waviness) typical of aluminum castings, as described above with respect for first embodiment landing surface 32.

A second embodiment insert 240 has a shape and dimensions that may be determined by the corresponding shape of the supercharger portion to which the insert is to be applied and by the desired machining for increasing the airflow characteristics of airflow path 221, such as for conforming to an outboard surface of pocket 228. Insert 240 is affixed in rotor housing 210 by screws 244, which are inserted through countersink holes 246 that extend through insert 240. Screws 244 are engaged with threaded holes 248 in rotor housing 210. The machining of the interior of rotor housing 210 and underside of insert 240 may be as generally described for first embodiment rotor housing 10 and insert 40, modified as needed to accommodate the structure of rotor housing 310 and insert 240.

FIGS. 22 through 25 illustrate a third embodiment supercharger rotor housing 310 that includes a pair of rotor bores 312 for rotors, a pair of recess 314 for air coolers, a input shaft housing 328 for receiving a input shaft assembly, and an air inlet structure 320 that in part defines an airflow path 321. Supercharger rotor housing 310 has a shape and dimensions to engage a General Motors LSA engine.

Figure 25:
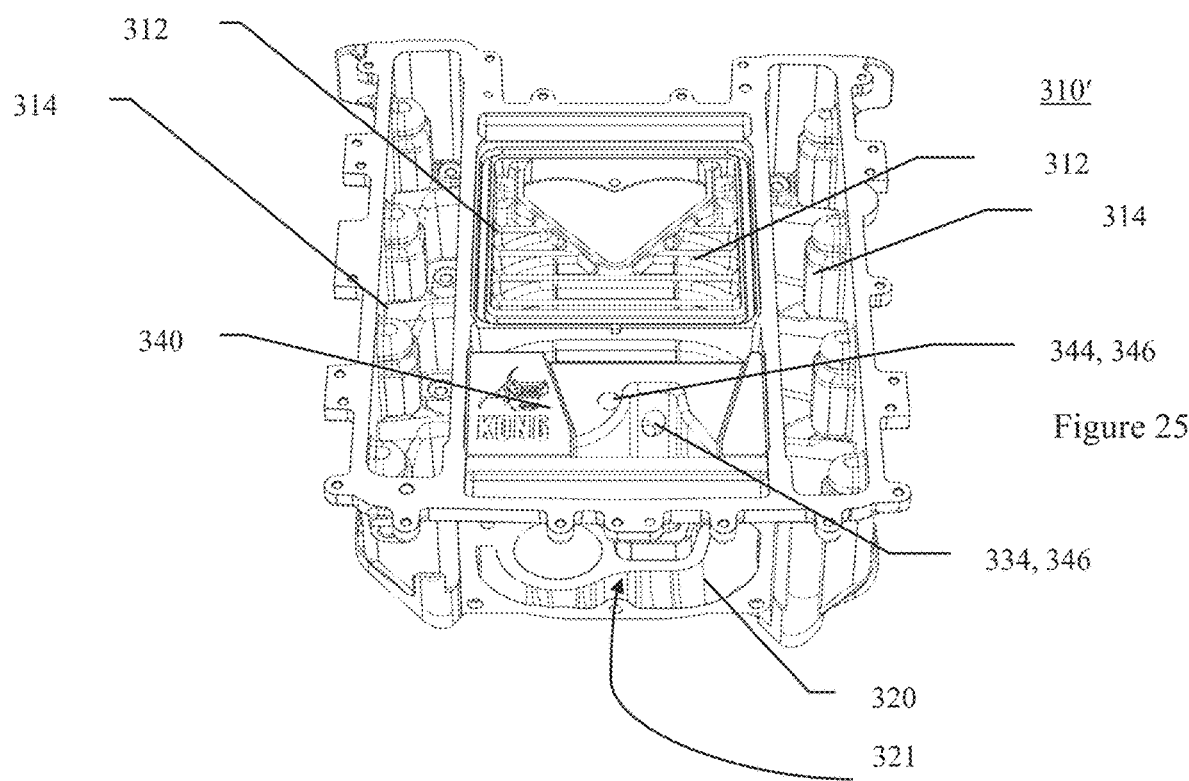
FIG. 25 is a top perspective view of the supercharger of FIG. 23 with an insert installed.

Rotor housing 310 includes an inboard surface 330 (FIG. 22) that is prepared for receiving an insert 440 (FIG. 25). rotor housing 310 includes a pair of threaded holes 348 (FIG. 25). In the embodiment of the FIGS. 23 and 24, a portion 332 (illustrated by highlighting) of inboard surface 330 is machined to reduce the surface roughness (and/or other surface finish parameters, such as waviness) typical of aluminum castings, as described above with respect for first embodiment landing surface 32.

A third embodiment insert 340 has a shape and dimensions that may be determined by the corresponding shape of the supercharger portion to which the insert is to be applied and by the desired machining for increasing the airflow characteristics of airflow path 321, such as for conforming to an outboard surface of pocket 328. Insert 340 is affixed in rotor housing 310 by screws 344, which are inserted through countersink holes 346 that extend through insert 340. Screws 344 are engaged with threaded holes 348 in rotor housing 310. The machining of the interior of rotor housing 310 and underside of insert 340 may be as generally described for first embodiment rotor housing 10 and insert 40, modified as needed to accommodate the structure of rotor housing 310 and insert 340.

Rotor housing 210 and 310 may be formed of a metal casting, as described with respect to first embodiment rotor housing 10. Rotor housing 10, 210, and 310 are described herein as examples that embody the inventive concepts. The present invention is not intended to be limited by the structural or functional details of the embodiments described herein. Rather, the inventors intend the scope of the invention to be defined by the claims.

According to another aspect of the disclosure, a method of increasing performance of a supercharger, especially an OEM supercharger, includes the steps of preparing the landing surface 32 of the rotor housing 10 for receiving the insert 40, affixing the insert 40 into the rotor housing such that surfaces 32 and 42 mate together, and machining the air inlet structure 20 to enlarge the airflow path 21 and to improve airflow characteristics, such as increasing airflow rate compared with an unmodified structure, through the air inlet structure 20. The landing surface 32 may be machined, preferably in a CNC machine or like automated machinery.

Figure 14:
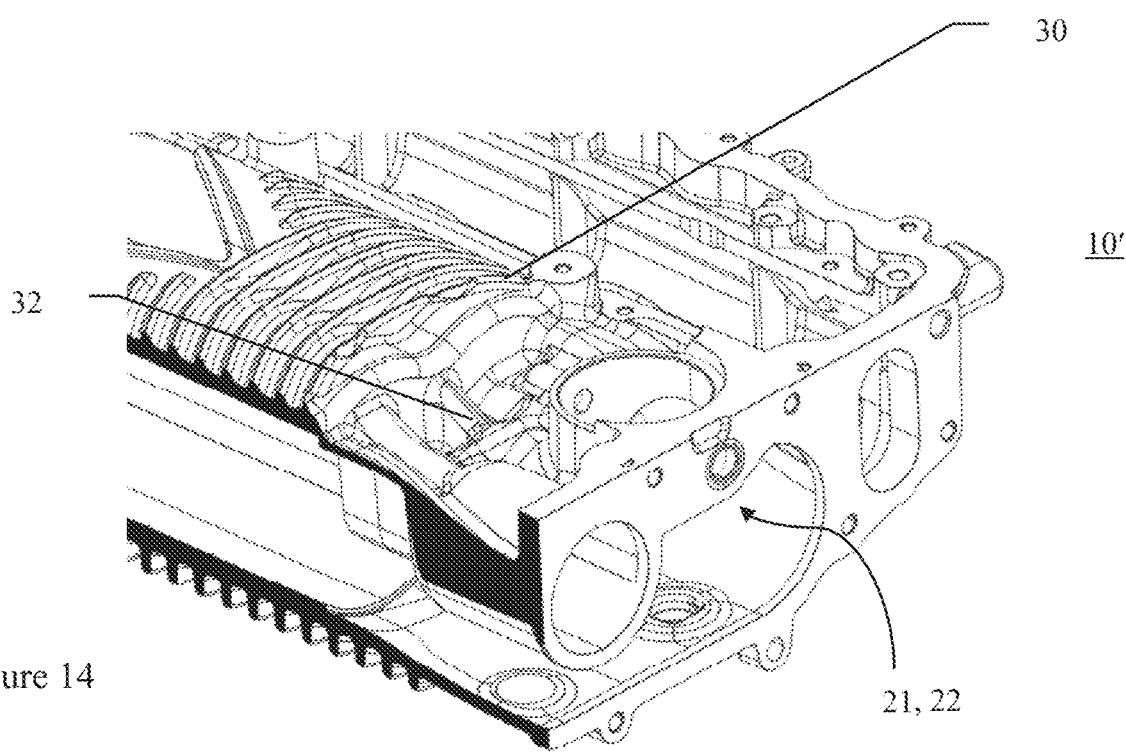
FIG. 14 is a perspective, cross section view of the supercharger of FIG. 13 after machining.

According to another aspect of the disclosure, an insert having the final shape of the machined insert, such as shown in FIG. 14, may be formed in its final configuration before installing onto rotor housing 10. For example, the insert may be formed of a polymer, a composite, and/or a metal via 3D printing, such as stereolithography (SLA), selective laser sintering (SLS), or like process. Thus, the insert may be mounted to landing surface 32 of the rotor housing 10, which is machined as described above. In this regard, the combination of insert and machined rotor housing is as shown in the figures.

The present invention is illustrated herein with reference for a particular embodiment as an example. The present invention is not limited to the structure or function of the particular example explained herein. Rather, variations of the example structure and function are contemplated by the inventors. For non-limiting examples, the present invention is not intended to be limited to any configuration of a supercharger, configuration of an insert (including the features and dimensions of the surfaces of the supercharger and the insert), materials. Moreover, more than one insert may be employed, any means for affixing an insert to the corresponding supercharger surface, any means for removing material to increase the airflow characteristics, and like variation to the structure and function described herein may be employed.

I claim:

1. A method for modifying a supercharger for an internal combustion engine to enhance airflow characteristics and supercharger efficiency, comprising the steps of:

providing a supercharger rotor housing including an air inlet structure that defines an airflow path;

affixing an insert to a landing portion of the supercharger rotor housing proximate the air inlet structure; and after the step of affixing the insert, machining an underside of the air inlet structure and, subsequent to machining the underside of the air inlet structure, machining into the underside of the insert, thereby enlarging the airflow path, thereby enhancing airflow through the air inlet structure such that a portion of the insert defines a portion of the airflow path after the machining step.

2. The method of claim 1 wherein the insert is formed via 3D printing in its useful configuration.

3. The method of claim 1 further comprising the step of machining the landing portion of the air inlet structure such that the landing portion is suitable for receiving the insert.

4. The method of claim 3 wherein the machined landing has a surface roughness that is at least 1 micron less than an average surface roughness of unmachined portions of the rotor housing.

5. The method of claim 3 wherein the machined landing has a surface roughness that is at least 3 microns less than an average surface roughness of unmachined portions of the rotor housing.

6. The method of claim 3 wherein the machined landing g has a surface roughness that is at least 8 microns less than an average surface roughness of unmachined portions of the rotor housing.

7. The method of claim 3 wherein the machined landing has a surface roughness that is less than 20 microns.

8. The method of claim 3 wherein the machined landing has a surface roughness that is at least 20 microns less than an average surface roughness of unmachined portions of the rotor housing.

9. The method of claim 3 wherein the air inlet structure of the supercharger is made from aluminum or an aluminum alloy.

10. The method of claim 3 wherein each one of the inlet structure and the insert are formed of an aluminum casting.

11. The method of claim 1 wherein further comprising the step of applying an adhesive to a mating surface of at least one of the landing surfaces and the insert, thereby filling gaps therebetween.

12. The method of claim 1 wherein the supercharger is an OEM supercharger.

13. A supercharger for an internal combustion engine comprising:
   a rotor housing including air intake structure that defines an airflow path and a landing surface proximate the air intake structure, the rotor housing being formed of a metal casting; and
   an insert affixed to the landing surface of the rotor housing such that an underside surface of the insert is in contact with the landing surface of the rotor housing;
   wherein a portion of the metal casting proximate the air intake structure opposite the landing surface is machined and a portion of the underside surface of insert is machined, thereby enlarging the airflow path through the air intake structure.

14. The supercharger of claim 13 wherein is formed via 3D printing in its useful configuration.

15. The supercharger of claim 13 wherein the insert is affixed to the landing surface of the rotor housing via screws.

16. The supercharger of claim 13 wherein the landing is machined.

\* \* \* \* \*